THOMAS WALLACE & G. W. HYDE.
Improvement in Smut-Machines.
No. 115,397. Patented May 30, 1871.
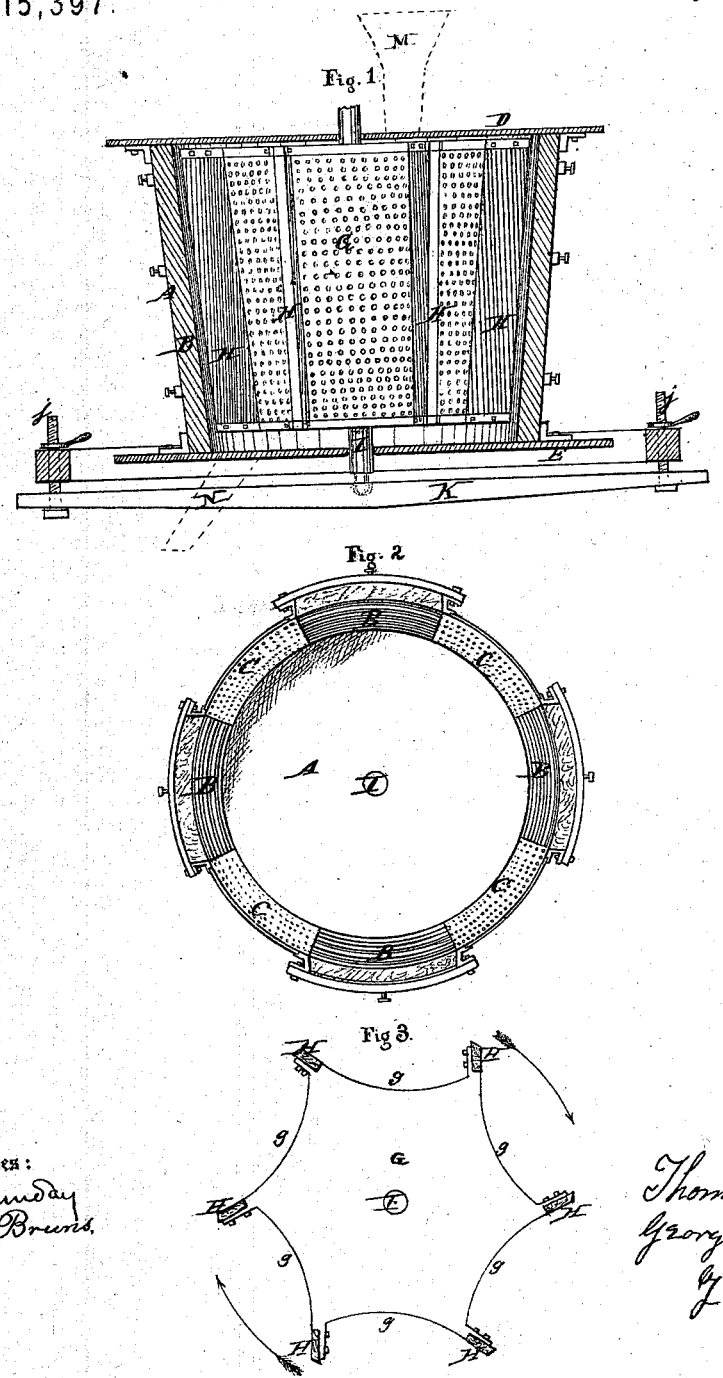

UNITED STATES PATENT OFFICE.

THOMAS WALLACE, OF CHICAGO, AND GEORGE WARREN HYDE, OF JOLIET, ILLINOIS.

IMPROVEMENT IN SMUT-MACHINES.

Specification forming part of Letters Patent No. 115,397, dated May 30, 1871.

*To all whom it may concern:*

Be it known that we, THOMAS WALLACE, of Chicago, in the county of Cook, and GEORGE WARREN HYDE, of Joliet, in the county of Will and State of Illinois, have invented certain Improvements in Smut-Machines; and we do hereby declare that the following is a full, clear, and exact description thereof, reference being had to the accompanying drawing, which, together with the letters and figures of reference marked thereon, forms part of this specification, and in which—

Figure 1 is a transverse vertical central section of the outer case with the beaters in position. Fig. 2 is a top or plan view of the outer case without the beaters. Fig. 3 is a top or plan view of the beaters removed from the case.

Like letters of reference made use of in the several figures indicate like parts.

General Description.

To enable those skilled in the art to make and use our invention, we will proceed to describe the same with particularity, making use in so doing of the aforesaid drawing.

A is a cylindrical case, made slightly conical, with the smallest diameter at the bottom. The sides of this case consist of alternating staves of emery-stone B and perforated metallic plate C. A top plate or cover, D, and a bottom plate, E, serve to inclose and strengthen the case. G is a conical shell with sides of perforated metal, and carrying beaters H of emery-stone. This shell is borne by the vertical shaft I, having bearings at the top and bottom of the case A, and being supported at the step J in the beam K. The shell and attached beaters are placed within the conical case A, and revolved by means of the shaft, the beaters being so arranged as to come nearly out to the edge or sides of the case, having a space of an inch (more or less) between the beaters and the sides. The sides of the shells between the beaters, which extend vertically from top to bottom, exhibit a concave curve, as shown at Fig. 3 of the drawing. This curve is so constructed that when the case is moving in the direction of the arrows the grain contained in the machine, after passing the beater, will strike against the concave surface $g$, and be thrown outward against the sides of the case, the direction of its leaving the said surface being a tangent to the direction of the revolving beaters; and the said grain will strike the sides of the case just in front of the beaters, which follow and thoroughly scour it by the double contact with the emery-stone beaters and emery-stone staves. The vertical shaft I is stepped or supported, as above stated, by the horizontal beam or step J, which is provided at each end with an adjusting-screw, $j$, whereby the shaft may be raised or lowered, carrying with it the shell G. This raising or lowering of the shell and beaters within the case regulates the space between the periphery of the beaters and the interior of the case sides at pleasure of the operator, as more or less power is required to properly scour the grain. The emery-stone of which we make the staves and beaters consists of a preparation of the well-known emery-grain or emery-sand of commerce made into a mass with some tenacious material, as, for instance, cement, which will harden and bind it together and form it into a stone-like substance. This emery surface, being exceedingly hard and gritty, is admirably adapted to scouring grain, as it will not readily wear out, and will not grind off the husk, but simply separate all the down and smut and extreme outer surface of the kernel, leaving the husk unbroken. The grain is admitted to the machine through the spout M to the space between the shell and case, and after being operated upon is withdrawn through the spout N.

When it is desired to combine a fan for blast purposes with this machine the fan may be carried upon the vertical shaft below the casing, in which event the said shaft may be made of a greater length proportionately than represented, and the step J applied beneath the fan.

We do not limit ourselves to the employment of emery in the construction of the stones above mentioned, as there are many substances which are substantially equivalents therefor. We may employ powdered glass or powdered millstone grit, or many other like substances, which may be formed into a stone-like substance by the employment of a tenacious vehicle, although we prefer to use the emery.

We are well aware that various preparations of emery-sand have been used to coat or cover the beaters and case of smut-machines to form a gritty surface; but we do not claim such, broadly, as our invention. We employ slabs made solidly throughout of emery or similar substance, held in form by cement or other tenacious vehicle forming an emery-stone, and which, however worn, will always present a proper surface for cleansing the grain.

Claims.

Having thus fully described the construction and operation of our invention, what we claim and desire to secure by Letters Patent is—

1. The combination of sections of emery-stone B and perforated plates C in a smutter-case, substantially as specified.
2. The combination, in a smut-machine, of the sections B and beaters H made of solid emery-stone, held in place without retaining lips or edges, so that the emery-stone may wear entirely out without disclosing any metal surface, as specified and shown.
3. The solid emery-stone beaters H, made and arranged as specified and shown.
4. The combination of the conical case A, conical beaters H, and shaft I having an adjustable step, J, substantially as and for the purposes specified.

THOMAS WALLACE.
GEORGE WARREN HYDE.

Witnesses to WALLACE's signature:
J. W. MUNDAY,
LEWIS F. BETTS.

Witnesses to HYDE's signature:
LORENZO F. GOODING,
FREDERICK WILLIAM GOOKIN.